United States
Hsieh et al.

[11] 3,902,790
[45] Sept. 2, 1975

[54] LIQUID CRYSTAL DISPLAY PATTERN

[75] Inventors: Paul Y. Hsieh, Irvine; Richard Belardi, Anaheim; Yat-Shir Lee, Costa Mesa; Claro M. Ortega, Santa Ana, all of Calif.

[73] Assignee: Hughes Aircraft Company, Culver City, Calif.

[22] Filed: Jan. 14, 1974

[21] Appl. No.: 433,326

[52] U.S. Cl. ......... 350/160 LC; 174/68.5; 339/17 M
[51] Int. Cl.² ............................................. G02F 1/13
[58] Field of Search.. 350/160 LC; 339/17 R, 17 M, 339/17 N, 17 T; 313/498, 502, 503, 506, 510

[56] References Cited
UNITED STATES PATENTS

| | | | |
|---|---|---|---|
| 2,921,257 | 1/1960 | Boicey | 339/17 T X |
| 3,246,193 | 4/1966 | Dickson, Jr. et al | 313/510 |
| 3,751,137 | 8/1973 | Fitzgibbons et al. | 350/160 LC |
| 3,807,833 | 4/1974 | Graham et al. | 350/160 LC |

*Primary Examiner*—Edward S. Bauer
*Assistant Examiner*—Matthew W. Koven
*Attorney, Agent, or Firm*—John M. May; W. H. MacAllister

[57] ABSTRACT

An improved electrode assembly is disclosed for use in a liquid crystal watch or other digital display employing a plurality of seven segment digits. One electrode of the display employs individual electric paths from respective termination pads to each segment of each digit (as well as to each dot of a colon and also to a "1"), while, on the opposing electrode a single shaped conductive area overlapping the various segments of the first electrode, but not overlapping any of said conductive paths, includes a highly conductive path from the area of one digit to that of another as well as an additional common busbar connected to the area adjacent each digit. This busbar may be gold-plated to further improve its conductivity and, in the completed electrode assembly, makes electrical connection to a termination pad located on the first electrode. When such an electrode assembly is used to display hours, minutes, and even seconds in a digital watch, irregularities in the response time of a field effect liquid crystal viewed between crossed polarizers are greatly reduced.

2 Claims, 3 Drawing Figures

LIQUID CRYSTAL DISPLAY PATTERN

CROSS REFERENCE TO RELATED APPLICATIONS

The application of Ernest C. Ho entitled "Digital Watch With Liquid Crystal And Light-Emitting Band Displays," Ser. No. 410,744, filed on Oct. 29, 1973; the application of Ernest C. Ho, Paul J. Clemmer, Richard Belardi and Eugene R. Keeler, entitled "Substrate Package For Liquid Crystal Watch," Ser. No. 423,360 filed on Dec. 10, 1973; and the application of Yat-Shir Lee, Paul Y. Hsieh and John E. Jensen, entitled "Liquid Crystal Mixtures For Electro-Optical Display Devices," Ser. No. 425,454, filed on Dec. 17, 1973; all of which applications are assigned to the same assignee as the present invention, are referred to herein and are incorporated in their entirety by this reference.

BACKGROUND OF THE INVENTION

Liquid crystals are no longer mere laboratory curiosities but are finding many practical applications, in particular in digital displays for use in pocket calculators, clocks, watches, voltmeters, and other portable apparatus requiring an inexpensive display having a low battery drain. Prior art applications of such displays maybe found in the various patents and articles noted in the above referenced patent applications. In particular, with the development of liquid crystal mixtures operable in a field-effect mode between two crossed polarizers operable with low power drain directly from commercially available batteries and with the development of highly sophisticated micro-electronic assemblies ingeniously arranged in a compact package, digital wrist watches employing liquid crystal displays to read out hours, minutes, and even seconds are now a commercial reality. Improvements to such watches are presently being made on many fronts. One area of particular concern has been the physiologically annoying appearance of the display caused both by slow response time of the liquid crystal and more particularly by variations or irregularities in the response time to different portions of the display. The user of a digital electronic watch expects the greatest possible accuracy and precision and is, therefore, upset with a display where the various digits do not appear with precise regularity changing exactly every second.

SUMMARY OF THE INVENTION

Accordingly it is the principal object of the present invention to provide an electrode assembly for use in a digital watch or other liquid crystal display which has associated with it the greatest possible regularity of the electrical-optical response time associated with each segment of each digit. It is another object of the present invention to provide this improvement in a form that is compatible with the compact substrate package of Messrs. Ho, Clemmer, Belardi, and Keeler. It is yet another object of the present invention to provide an electrode assembly that is easily assemblable and which may use epoxy to hermetically protect the liquid crystal material from undesirable contaminants.

The invention which satisfies these and other objectives comprises two opposing transparent conductor-on-glass electrode sub-assemblies, the first of said assemblies having a plurality of digit defining segments for each of the plurality of digits (in the preferred embodiment disclosed herein 3½ digits), each segment being connected by conductive path defined within said conductive electrode and terminated in a discrete termination along one edge of said first sub-assembly; the other of said sub-assemblies having a single conductive area overlapping the digit-defining areas of said first sub-assembly, said portions being connected serially one to another by means of a relatively highly conductive path, said portions also each being individually connected to a common busbar terminating in a connection pad for connection to a termination pad on said first sub-assembly.

The features of the present invention which are believed to be novel are set forth with particularity in the appended claims. The present invention both as to its physical structure and as to the method of its manufacture, together with further objects and advantages thereof, may be better understood by reference to the following detailed description taken in conjunction with the accompanying drawings.

DETAILED DESCRIPTION OF THE DRAWINGS

Figure 1:
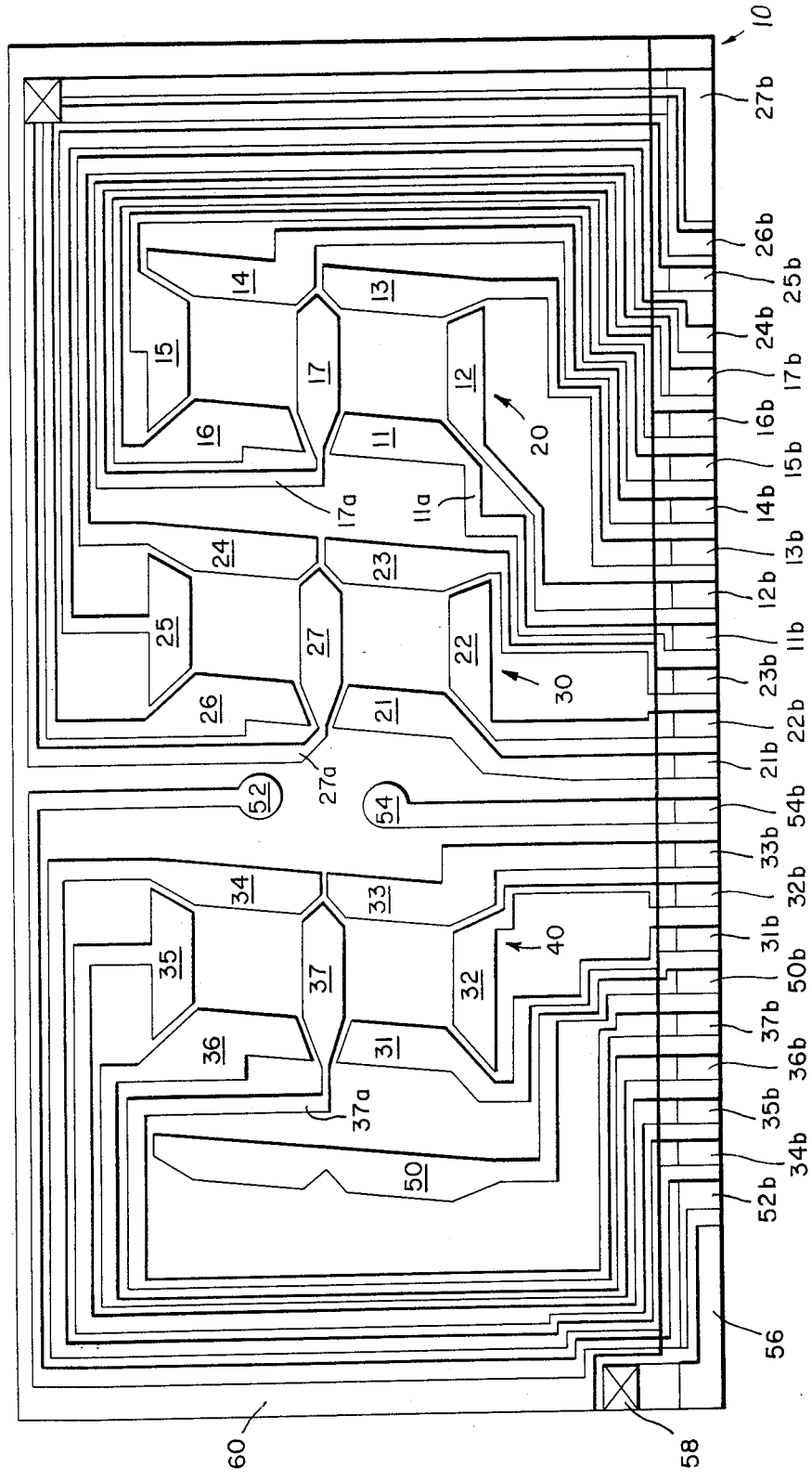
FIG. 1 is a plan view of a first electrode sub-assembly having individual digit segments and associated conductive paths defined on the upper surface thereof.

Referring now to FIG. 1, it may be seen that the first electrode of sub-assembly 10 includes a plurality (in the particular embodiment illustrated) of digit segments 11 through 17 which define a first digit 20 as well as additional segments defining second and third digits 30 and 40 respectively, a one defining segment 50, and two circular colon defining segments 52 and 54. Each of these segments is connected by a serpentine conductive path such as 11a to a gold plated termination pad such as 11b. Other termination pads (12b, 13b ... 54b) are provided for the remaining segments. An additional termination pad 56, is connected to a crossover point 58, and is provided for making electrical connection to a corresponding crossover point on the opposing counter electrode. The various segment defining portions conductive paths, and termination pads of electrode sub-assembly 10 are deposited on a glass substrate 60. The particular electrode configuration shown may be conveniently manufactured from commercially available indium oxide coated glass which typically has a resistivity on a range of from 100 to 500 ohms per square by a method which will be described in detail hereinafter.

Figure 2:
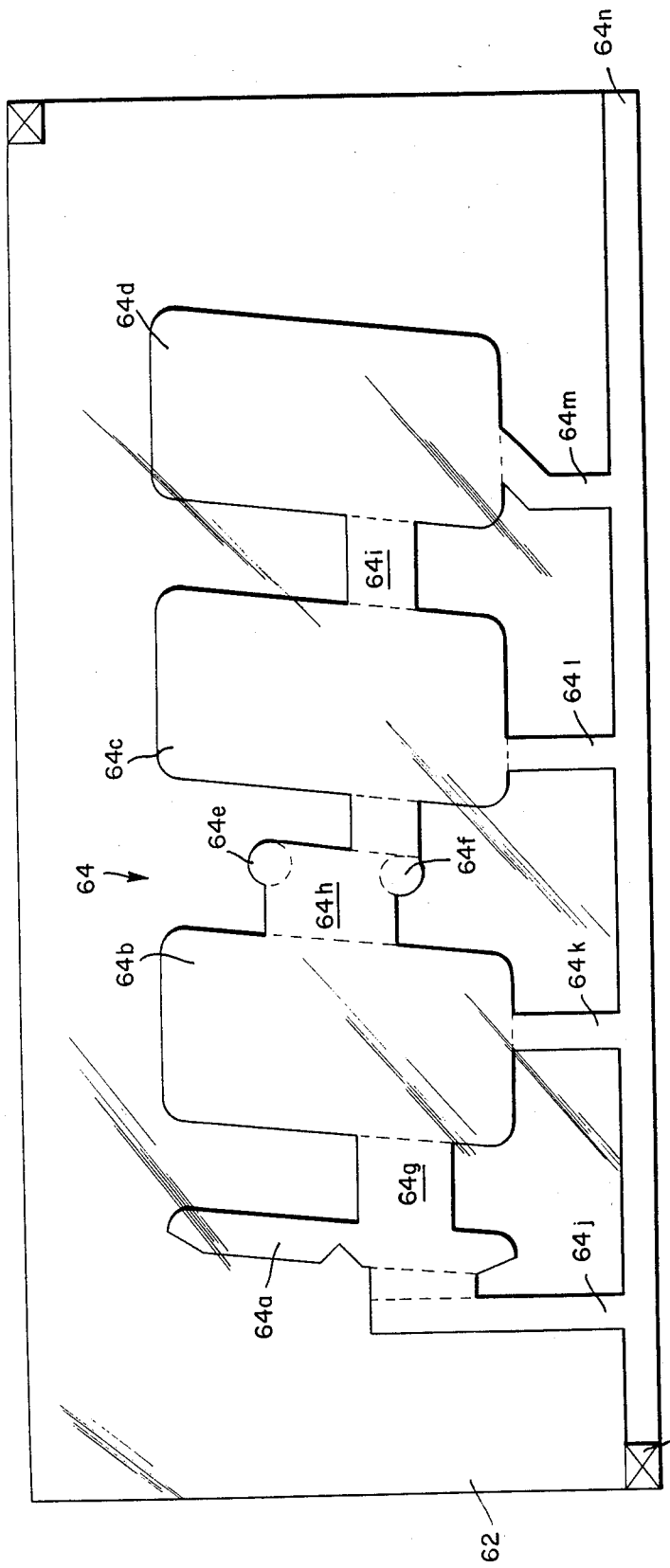
FIG. 2 is a plan view of a second electrode sub-assembly having a counter-electrode constructed in accordance with the present invention defined on the lower surface thereof.

Referring now in particularity to FIG. 2 wherein the counter electrode subassembly is illustrated in plan view, it may be seen that this subassembly also is constructed on a glass substrate 62 having a transparent electrode configuration 64 constructed on the lower face thereon. Electrode configuration 64 comprises a one defining portion 64a which in the completed assembly is opposite one defining segment 50 of the first electrode subassembly. A most significant digit portion 64b, a second most significant digit portion 64c and a least significant portion 64d corresponding to the seven segment digits designated by reference numerals 40, 30, and 20 in FIG. 1. Also forming part of shaped counter electrode 64 are colon defining areas 64e and 64f and inter-digit serial connections (designated in FIG. 2 as 64g, 64h, and 64i) as well as individual connection leads 64j, 64k, 64l, and 64m which are connected to a gold plated parallel bus bar 64n which comprises a termination at 64o opposite the corresponding termination pad 58 of the first electrode sub-assembly.

Inasmuch as one of the principal objectives of the present invention is to reduce any possible voltage drop between the termination pad 56 and the further digit defining portion 64b (via connecting pads 58 and 64o and interconnecting portion 64g, 64h, and 64i, via parallel bus 64n and connecting portions 64k, 64l, and 64m), the dimensions of interconnecting portions 64g, 64h, and 64i should be as broad as possible (thereby improving their conductivity), providing, however, that they not overlap the conductive path defined on lower substrate 10 (in particular conductive path 37a emanating from central segment 37 of significant digit 40, path 27a from the corresponding segment 27 of second most significant digit 30, and paths 17a and 11a emanating from segments 17 and 11 respectively of least significant digit 20).

Typical dimensions might be a digit area (for example 64d) of 0.110 by 0.200 inch, an individual segment (for example, 11) width of 0.025 inch and length of about 0.080, individual segment conductive path (for example, 11a) widths of from 0.015 to as little as 0.005, inter-digit conductive path (for example, 64i) widths of from 0.040 to 0.055, and parallel bus bar and connections therefrom (and for example, 64n) widths of about 0.020.

Figure 3:
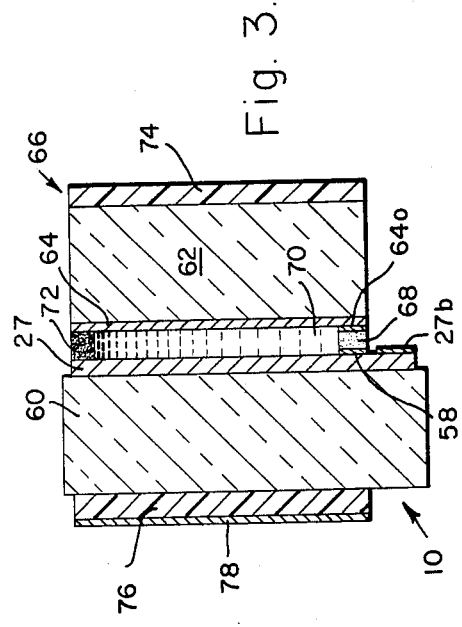
FIG. 3 is a cross section of a completed liquid crystal display cell incorporating the electrode assembly of the present invention.

Referring now with greater particularity to FIG. 3 which shows a completed electrode assembly filled with liquid crystal material and provided with polarizers and reflector to make the selected digits visible, it may be seen that the first electrode subassembly 10 comprising glass substrate 60 as well as various electrode segments and conductive paths (indicated on the figure with the reference numeral 27) as well as gold plated terminations (indicated on the figure with reference numeral 27b) is located opposite a second electrode subassembly 66 comprising glass substrate 62 on which the completed counter electrode pattern 64 has been appropriately etched. Electrode 64 is provided with a termination pad 64o which is connected (using a conductive epoxy 68) to the corresponding termination pad 58 of subassembly 10.

Contained between the two opposing electrodes is liquid crystal material 70 which is preferably a field effect nematic liquid crystal having a wide temperature range and a low voltage requirement such as is disclosed in the above referenced application by Messrs. Lee, et al entitled "Liquid Crystal Mixtures for Electrode Optical Display Devices". By way of example one of the preferred compositions disclosed in that application functions from about −50° to about 70°C and has an operating voltage of 3.2 volts peak to peak at 60 Hertz. Such a voltage is low enough that the display can be driven by two commercially available batteries in series without the need of an additional converter.

The field effect display is rendered visible by placing the display cell between two linear polarizers 74 and 76 whose direction of polarization may be placed either perpendicular or parallel to each other. For reflective viewing of this type of display a diffuse reflector 78 is placed on the back side of the polarizer which is on the opposite side to the viewer. The reflector is prepared by coating a silver or aluminum paint directly on the back polarizer or on a third surface and then placing it against the back polarizer.

The substrate commercially available for preparing the transparent electrodes for liquid crystal displays is glass coated with a thin layer of either indium oxide ($InO_x$) or tin oxide ($SnO_x$) on one of its surfaces. $InO_x$ coated glass is to be preferred because of its better transparency and easier photoetching.

The resistivity of $InO_x$ layer varies somewhat from batch to batch and from vendor to vendor. For example, the glass obtained from one particular vendor has a resistivity of 100–300 ohms per square, while that supplied by another has about 500 ohms per square resistivity. No significant differences in the display performance result from resistivity differences of these magnitudes.

The gold bar 64n and pads 64o, as well as 56 and 11b, 12b . . . 54b are deposited on $InO_x$ by the subtraction process in the electrode fabrication now to be described.

The $InO_x$ coated glass from a commercial source is vacuum deposited with a thin layer of Ni-Cr and then a gold layer to a thickness which gives a resistivity of about 1 ohm per square on top of the $InO_x$ layer (conductive side). The purpose of providing this Ni-Cr layer is to improve adhesion between $InO_x$ and gold and its thickness is not therefore critical.

The substrate after the vacuum deposition is coated with a thin layer of photoresist, for example that known as Waycoat, obtainable from Hunt Chemical Company, and is exposed to an ultra-violet light using a conventional black-and-white photographic mask. The display pattern (64a, 64b, etc.) and leading lines (64g, 64h, etc.) are white in the mask. After the exposure, the photoresist is developed, i.e., the area corresponding to the black area of the photo-mask is dissolved away in a developer solution. The gold, Ni-Cr, and $InO_x$ layers in the areas unprotected by the photoresist layer are than etched away sequentially by known, conventional methods. The display patterns and leading lines are in gold at this point.

In order to leave gold only in the desired area, gold and Ni-Cr in the rest of the pattern must be subtracted (removed) by photo etching. Hence, the etched electrode is again coated with photoresist, exposed to UV light with the second mask which has the pattern corresponding to the desired gold pattern on the final electrode.

Photo etching has been described in the preparation of the gold bar 64n. Direct vacuum deposition of gold (or other metals) in the desired area is also possible by using a metal mask. Although this may appear simpler, holding the metal mask against the $InO_x$ coated glass in a vacuum evaporator is more tedious.

Gold is preferred in this fabrication process solely for the convenience of later wire bonding to external display driving circuits. Other metals such as silver, nickel, aluminum etc., may also be used instead, and will also result in the desired resistivity of less than 1 ohm per square.

For the reflective viewing displays using the dynamic scattering mode rather than the field-effect device described above, the back electrode subassembly 10 may have a reflective layer prepared from aluminum, chrome, silver, gold, etc., instead of $InO_x$ of $SnO_x$, or a conventional mirror may be placed in the back of the display. A dielectric reflector may also be used.

Although the device which has just been described appears to afford the greatest advantages for implementing the present invention, it must be understood that various modifications may be made thereto without going beyond the scope of the invention as claimed. For instance, it is possible to make substitutions not only in materials and methods of fabrication but also to change the shape or the number of the various digits being displayed, to display information other than hours, minutes and seconds or to utilize other voltage dependent optical effects and still stay within the spirit of the present invention.

What is claimed is:

1. A liquid crystal cell for displaying selected segments of digits and other information, comprising:
    a first electrode sub-assembly formed on the upper surface of a first substrate having defined thereon a plurality of conductive segments insulated one from another, each of said segments being provided with a serpentine conductive path terminating in a discrete termination pad, all of said termination pads being arrayed along one edge of said electrode subassembly;
    a second electrode sub-assembly formed on the lower surface of a second substrate having defined thereon a conductive electrode portion, said second sub-assembly being positioned substantially opposite said first sub-assembly and spaced apart therefrom, said electrode portion comprising:
    a generally rectangular horizontal array of digit defining areas, each of said digit defining areas overlapping a respective set of segments of said first electrode sub-assembly but not overlapping any of the conductive paths emanating therefrom;
    a low resistance interdigit conductive path area from the left side of one of said digit defining areas to the right side of a successive one of said digit areas, said conductive path area overlapping essentially all of a nonconductive area defined on said first electrode subassembly;
    an individual conductive path to the bottom side of each of said digit defining areas; and
    a low resistance parallel bus bar physically and electrically connecting each of said individual conductive paths one to another, said bus bar being provided with a termination pad making electrical contact with a corresponding termination pad provided on said first subassembly; and
    a liquid crystal material contained in the space between said first substrate upper surface and said second substrate lower surface, said material having changeable optical properties when an electrical potential is provided between at least one of said conductive segments and said digit defining areas.

2. The electrode assembly of claim 1 wherein said parallel bus bar has an effective resistivity of less than one ohm per square.

* * * * *